(12) United States Patent
Grinsted

(10) Patent No.: US 7,377,412 B2
(45) Date of Patent: May 27, 2008

(54) LONGITUDINAL LOAD VARYING DEVICE FOR ELONGATE MEMBERS

(75) Inventor: Timothy William Grinsted, Northumberland (GB)

(73) Assignee: The Engineering Business Limited (GB)

(*) Notice: Subject to any disclaimer, the term of this patent is extended or adjusted under 35 U.S.C. 154(b) by 0 days.

(21) Appl. No.: 11/698,413

(22) Filed: Jan. 26, 2007

(65) Prior Publication Data

US 2007/0119896 A1 May 31, 2007

Related U.S. Application Data

(62) Division of application No. 10/532,383, filed as application No. PCT/GB03/04697 on Oct. 31, 2003, now Pat. No. 7,178,708.

(30) Foreign Application Priority Data

Nov. 1, 2002 (GB) ................. 0225496.9

(51) Int. Cl.
*B65H 20/00* (2006.01)
(52) U.S. Cl. ..................... 226/172; 254/265
(58) Field of Classification Search ................ 226/171, 226/172, 173, 176, 190, 195; 405/168.3–168.4; 254/265
See application file for complete search history.

(56) References Cited

U.S. PATENT DOCUMENTS

| | | | | |
|---|---|---|---|---|
| 1,759,105 A | * | 5/1930 | Evans ........................ | 57/138 |
| 3,589,580 A | * | 6/1971 | Smulders ................... | 226/108 |
| 4,285,454 A | * | 8/1981 | Plumettaz .................. | 226/174 |
| 5,263,624 A | * | 11/1993 | Zuidberg .................... | 226/190 |
| 6,425,441 B2 | * | 7/2002 | Shaaban et al. ........... | 166/77.3 |
| 6,439,445 B1 | * | 8/2002 | De Groot et al. .......... | 226/172 |
| 6,619,432 B1 | * | 9/2003 | Yasui ......................... | 187/250 |
| 6,651,858 B2 | * | 11/2003 | Shen .......................... | 226/176 |
| 7,021,510 B2 | * | 4/2006 | Ellingson ................... | 226/172 |
| 7,178,708 B2 | * | 2/2007 | Grinsted .................... | 254/265 |
| 2001/0040031 A1 | * | 11/2001 | Shaaban et al. ........... | 166/77.3 |
| 2005/0179019 A1 | * | 8/2005 | Ellingson ................... | 254/265 |
| 2006/0208245 A1 | * | 9/2006 | Diehl ......................... | 254/265 |

* cited by examiner

*Primary Examiner*—Evan Langdon
(74) *Attorney, Agent, or Firm*—Ryan A. Schneider, Esq.; Troutman Sanders LLP

(57) ABSTRACT

A tensioner for deploying a member such as a pipe or cable, such as a sub-sea cable deployed from a ship, comprises an endless track and drive means for driving the track. The track includes a plurality of traction elements mounted thereon for movement with the track. Each traction element includes one or more cushions for supporting the member, and a pair of opposed arms mounted on respective sides of the base of the traction element. One or more of the arms is pivotally mounted for movement between a clamping position and a release position. In an alternative arrangement, four moveable arms are linked in diametrically opposite pairs to move between a release position and a clamping position. Cushions on the arms clamp the member in conjunction with the cushions of the traction element, when the arms are in the clamping position. Guide means are provided to urge the arms into the clamping position to grip the member as it passes through the tensioner.

12 Claims, 4 Drawing Sheets

LONGITUDINAL LOAD VARYING DEVICE FOR ELONGATE MEMBERS

BENEFIT CLAIM

This application is a divisional of U.S. application Ser. No. 10/532,383, filed 21 Apr. 2005, now U.S. Pat. No. 7,178,708 which is a US National Stage of International Application No. PCT/GB03/004697 filed 31 Oct. 2003, which claims the benefit of GB 0225496.9 filed 1 Nov. 2002.

FIELD OF THE INVENTION

The present invention relates to apparatus for gripping an elongate member and applying a continuous longitudinal load to the member while allowing the member to move in a controlled manner through the apparatus.

More specifically, the present invention relates to tensioners for pipes and/or cables, in particular for laying pipes or cables offshore, and especially (but not exclusively) to such tensioners for use with so-called, Integrated Service Umbilicals (ISUs).

BACKGROUND OF THE INVENTION

Tensioners as such are known in the art and are used to grip pipes or cables as they are deployed from a ship to the sea bed during offshore installation. The tensioners maintain a constant tension in the pipe or cable (hereinafter "member") as it is deployed over the side of the vessel. Conventional tensioners consist of a number of traction devices having a track, each track comprising a number of contacting elements arranged on a continuous belt or loop. The track is driven so that as the contacting elements move with the belt or loop they move along a path or section in which contacting surfaces the contacting elements bear against the member and so control the passage of the pipe or cable through the tensioner. Typically two, three or four tracks are provided arranged equidistantly around the member. Providing a higher number of tracks (for example four rather than two) achieves a more even distribution of the loading on the member gripped by the tensioner and, for a given coefficient of friction between the tensioner and the member reduces the length over which the member has to be gripped in order to achieve a desirably low tensile force.

ISUs are relatively stiff but delicate "cables" which consist of a number of elements such as hoses, power cables and signal cables in a single package, generally of circular cross section. ISUs cannot withstand high clamping loads which are conventionally applied when laying pipes for example. In order to avoid such high clamping loads, ISUs require very long pipe tensioning machines (even where four tracks are provided) to provide the required grip on the ISU while providing sufficiently high hold-back tension (typically of the order of 60 tonnes) which is necessary for laying cable from a ship into very deep water.

Conventional traction devices are arranged so that the clamping forces on the member are reacted by the traction devices themselves, opposing traction devices being urged by hydraulic or mechanical means onto the member to provide the gripping force. The traction devices are thus required to resist both the tensile force resulting from the laying of the member and the gripping forces normal to the longitudinal axis of the member. This necessarily means that each traction device is relatively large and heavy and this problem is multiplied where higher numbers of traction devices are needed.

BRIEF SUMMARY OF THE INVENTION

The present invention seeks to provide a tensioner in which the forces which traction devices must resist are minimised, so contributing to a reduction in the size of the tensioner and further to provide a gripping arrangement for a tensioner which reduces the required number of traction devices.

According to a first aspect of the invention there is provided a tensioner for deploying an elongate member comprising:

i) an endless track including a plurality of traction elements, each traction element comprising a base unit including at least a first gripping surface and first moveable arm and a second arm each including a further gripping surface, the arms being mounted at respective sides of the traction element and the first arm being operatively moveable about a pivot axis between a first position in which the further gripping surface of said first arm is spaced from the member and a second position in which said further gripping surface of said first arm can contact the member;

ii) drive means for driving the track so that the traction elements move along an endless path, said endless path including a path segment along which said first gripping surfaces operatively contact the member;

iii) first guide means which operatively co-operates with the first arm to urge the first arm from said first position to said second position such that the first arm maintains said second position as the traction elements move along said path segment; and iv) second guide means which operatively co-operates with said second arm to form, in said path segment, a reaction surface for a reaction force substantially normal to said surface and to the longitudinal axis of the member.

In a much preferred embodiment of this aspect of the invention, the second arm is also operatively moveable about a pivot axis between a first position in which the further gripping surface of said second arm is spaced from the member and a second position in which said further gripping surface of said second arm can contact the member and said second guide means operatively co-operates with the second arm to urge the second arm from said first position to said second position such that the second arm maintains said second position as the traction elements move along said path segment.

Preferably in said path segment, the pivot axis of the or each arm is operatively substantially aligned with the longitudinal axis of the member.

Where only the first arm is moveable, preferably the first guide means presents a guide surface operatively co-operating with a contacting surface of the first arm, the guide surface extending generally longitudinally with respect to the member and being so shaped in a portion preceding said path segment to move said first arm from the first position to the second position and in a portion succeeding said path section to allow the first arm to move from said second position to said first position.

Where both the first and second arms are moveable, preferably the guide means present respective first and second guide surfaces operatively co-operating with a contacting surface of said respective arms, the guide surfaces extending generally longitudinally with respect to the member and being so shaped in a portion preceding said path segment to move said arms from the first position to the second position and in a portion succeeding said path section to allow the arms to move from said second position to said first position.

Preferably the first and second guide surfaces are defined on first and second guide rails.

In a preferred embodiment of this aspect of the invention the contacting surfaces of the or each arm comprises a surface of a roller mounted on the arm for rotation about an axis substantially perpendicular to the pivot axis of the first arm; in another preferred embodiment of this aspect of the invention, the base unit comprises two first gripping surfaces such that when the arms are in their second position the four gripping surfaces are equidistantly spaced.

According to a second aspect of the present invention there is provided a tensioner for deploying an elongate member comprising:

i) an endless track including a plurality of traction elements, each traction element comprising:
    (a) a base unit;
    (b) first and second arms mounted at respective opposite sides of the traction element and each including a gripping surface operatively disposed above the longitudinal axis of the member; and
    (c) third and fourth arms also mounted at respective opposite sides of the traction element and each including a gripping portion operatively disposed below the longitudinal axis of the member, each said arm being operatively moveable about a pivot axis between a first position in which the gripping surfaces are spaced from the member and a second position in which the gripping surfaces can contact the member;
  ii) drive means for driving the track so that the traction elements move along an endless path, said endless path including a path segment along which said gripping surfaces operatively contact the member;
  iii) guide means which operatively co-operates with the first and second arms to urge the first and second arms from said first position to said second position such that the first and second arms maintain said second position as the traction elements move along said path segment; and
  iv) a first linkage connecting the first arm and the fourth arm and a second linkage connecting the second arm and the third arm such that movement of the first and second arms between their first and second positions causes a corresponding movement of the third and fourth arms between their first and second positions.

Preferably, in said path segment, the pivot axes of the arms are operatively substantially aligned with the longitudinal axis of the member.

In a much preferred arrangement, respectively the first and third arms and the second and fourth arms pivot about a common axis.

In a further preferred arrangement, the common axes of the first and third and second and fourth arms, and the longitudinal axis of the member operatively lie in the same plane.

In a preferred embodiment of the second aspect of the invention, the first and third arms each include an extension portion extending below their pivot axis, and the first and second linkages comprises a link arm which is pivotally attached at a first end to a lower region of the extension portion of the respective first or second arm and which is pivotally attached at a second end to a lower portion of the third or fourth arm.

Preferably the guide means present respective first and second guide surfaces operatively co-operating with a contacting surface of said first and second arms, the guide surfaces extending generally longitudinally with respect to the member and being so shaped in a portion preceding said path segment to move said arms from the first position to the second position and in a portion succeeding said path section to allow the arms to move from said second position to said first position. The first and second surfaces are preferably defined on first and second guide rails.

In a preferred embodiment of this aspect of the invention the contacting surfaces of the first and second arms comprise a surface of a roller mounted on the arm for rotation about an axis substantially perpendicular to the pivot axis of the arm In a much preferred arrangement of this aspect of the invention the gripping surfaces of the arms are, in use, equidistantly spaced about the circumference of the member in their second position.

In a preferred embodiment of the first and second aspects of the invention, the endless track comprises first and second track belts operatively driven in unison and wherein each traction element includes first and second attachment wings extending laterally from the base unit and fixedly mounted on a respective track belt.

BRIEF DESCRIPTION OF THE FIGURES

For a better understanding of the invention and to show how the same may be carried into effect, reference will be made, by way of example only, to the following drawings in which.

DETAILED DESCRIPTION OF PREFERRED EMBODIMENTS

Figure 1:
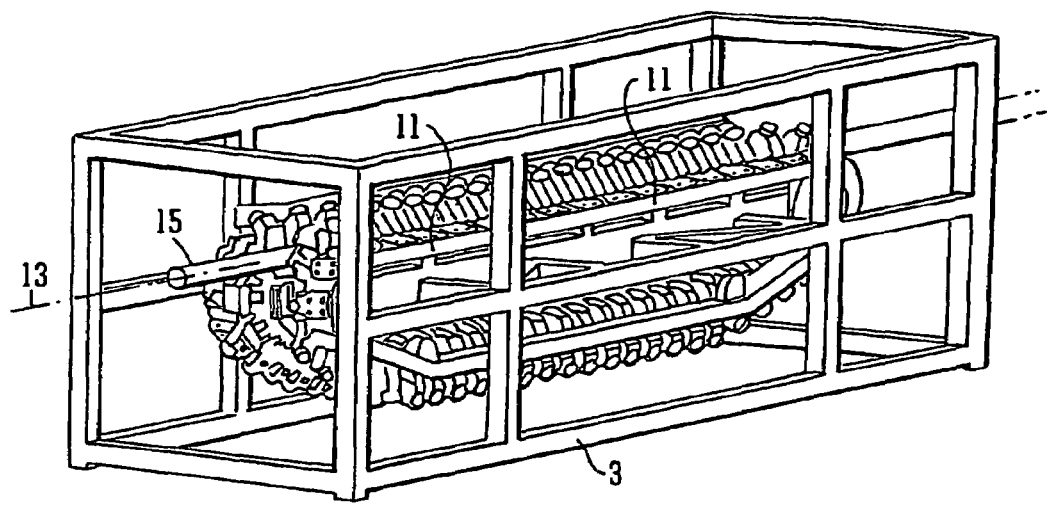
FIG. 1 is a perspective view of one example of a tensioner according to the invention.

Referring now to FIGS. 1 to 5, the tensioner 1 is mounted in a frame 3 and comprises an endless track 5 consisting of two parallel track belts 5a and 5b which are driven by suitable drive means (not specifically illustrated). Mounted on the respective track belts 5a, 5b is a number of spaced traction elements 7. Each traction element 7 includes a pair of lateral wings 9 by means of which it is attached to a respective track belt 5a, 5b for movement with the track belt. The track 5 is mounted and driven so that the traction elements 7 describe a path in the form of an endless loop. The path includes a path segment 11 in which the path is essentially straight and aligned with the longitudinal axis 13 of the member (pipe or cable or ISU etc) 15.

Figure 4:
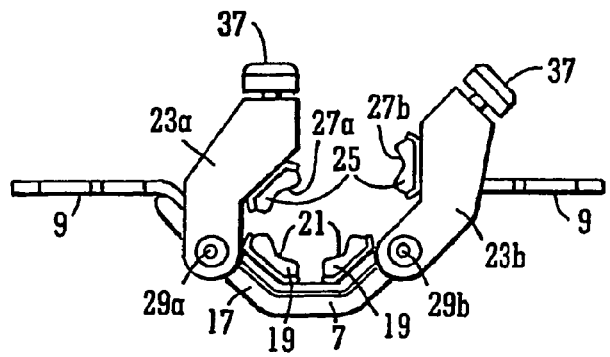
FIG. 4 is a plan view of a traction element of the tensioner of FIG. 1.
Figure 5:
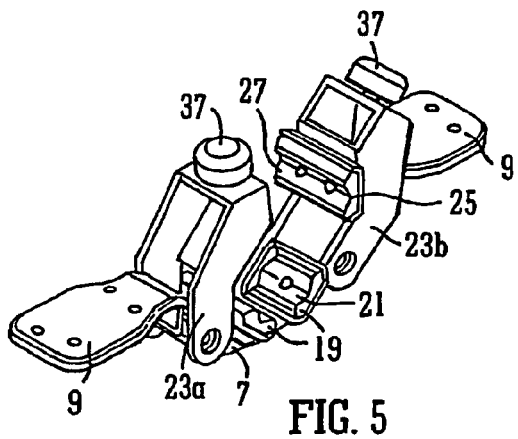
FIG. 5 is a perspective view of the traction element of FIG. 4.

Each traction element 7 is essentially similar and consists of a base unit 17 on which are mounted pads or cushions 19 which define gripping surfaces 21 which contact the member in use. The two lateral wings 9 depend from the respective sides of the base unit 17 and may be formed integrally therewith. At either side of the base unit 17 are mounted arms 23a and 23b. On each arm is mounted a pad or cushion 25 which is generally similar to the pads or cushions 19 and which defines a further gripping surface 27a, 27b. The arms 23 are mounted on the base unit so that they can rotate with respect to the base unit 17 about axes 29a and 29b. The axes 29a and 29b are parallel to the longitudinal axis of the member 15 when the member is retained in the tensioner 1. The rotation of the arms 23a, 23b about the axes 29a, 29b allows the arms 23a, 23b to move between a clamping position in which the member 15 is gripped by the further gripping surfaces 27a, 27b (in combination with the gripping surfaces 21 of the base unit 17) and a release position in which the further gripping surfaces 27a, 27b are spaced from the member. FIGS. 4 and 5 specifically illustrate the clamping and release positions of arms 23a and 23b. In these Figures, the arm 23a is shown in the clamping position and the arm 23b is shown in the release position. (NB: the positions of the arms as shown are for the purposes of illustration and explanation only. In normal use, the arms will move in tandem so that both are in the clamping position or both are in the release position).

Figure 2:
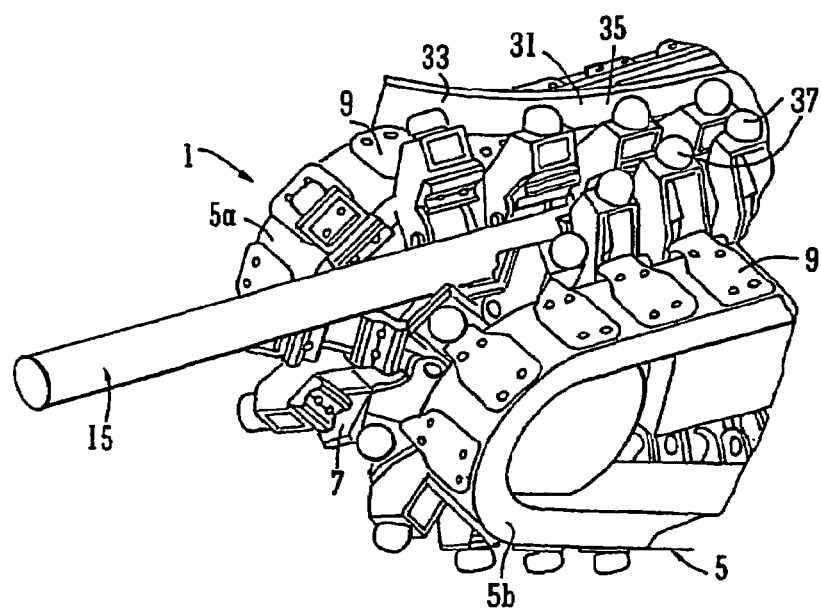
FIG. 2 is a more detailed view of an end portion of the tensioner of FIG. 1.
Figure 3:
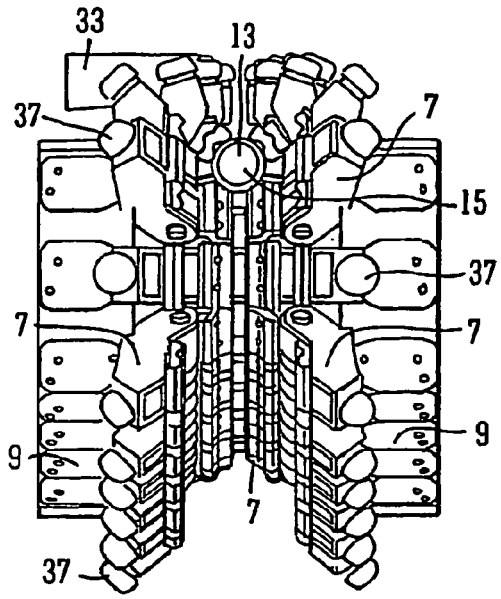
FIG. 3 is an end view of the tensioner of FIGS. 1 and 2.

In order to move the arms 23a, 23b from the release position to the clamping position, guide means 31 are provided which in the illustrated embodiment takes the form of a guide bar or rail 33. In FIGS. 1, 2 and 3 the guide rail for the arms 23b is omitted for reasons of clarity. The guide rails 33 are arranged generally parallel to the longitudinal axis of the member 15 as it passes through the tensioner and present a smooth guide surface 35 which contacts the arms 23a, 23b. The guide surface includes a curved entrance portion which guides the arms 23a, 23b from the release position to the clamping position and a correspondingly curved exit portion which allows the arms 23a, 23b to move from the clamping position to the release position. Between the entrance and exit portions, the guide surface comprises a straight portion which is aligned with the longitudinal axis of the member 15 and which maintains the arms 23a, 23b in the clamping position. The straight portion corresponds to and is generally co-extensive with the path segment 11 of the track 5 which segment is essentially straight and aligned with the longitudinal axis 13 of the member 15. The size of the base unit 17 and the arms 23a, 23b, the spacing of the pads or cushions 19, 25 and the position and spacing of the guide rails 33 are all selected in accordance with the size of the member 15 to be deployed and the clamping force which is required.

In the illustrated embodiment, the arms 23a, 23b are provided with rollers 37 for co-operating with the guide surface 25. The rollers are mounted on the ends of the arms 23a, 23b distal from the base unit 17 and rotate about an axis which is normal to the pivot axes 29 of the arms.

In use of the tensioner 1, the track 5 is driven in the forward or reverse direction as appropriate to move the traction elements 7. The member 15 is fed into the tensioner 1 so that it is accommodated on pads or cushions 19 of base units 17 entering and passing through the path segment 11. As successive traction elements approach the path segment 11, the guide rails 33 move the arms 23a, 23b from the release position to the clamping position so that in the path segment 11 the member is clamped by the pads or cushions 19 in combination with the arm pads or cushions 25. The pads or cushions 19, 25 are so disposed that, with the arms 23a, 23b in the clamping position, the pads or cushions 19, 25 are equidistantly spaced about the circumference of the member 15. At the end of the path segment 11, the guide rails 33 release the arms 23a, 23b. Thus, with the member clamped by the pads or cushions 19, 25 in the path segment 11, movement of the member 15 is controlled by the tensioner 1 so that the member can be paid out or deployed, such as in sub-sea cable laying, at an appropriate tension.

Figure 8:
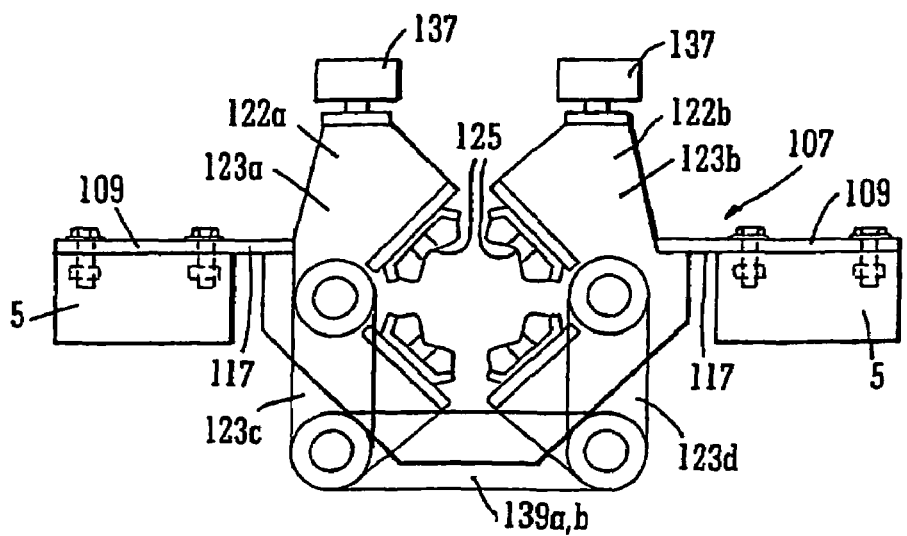
FIG. 8 is an end view of a traction element of the second aspect of the invention in a gripping condition.
Figure 9:
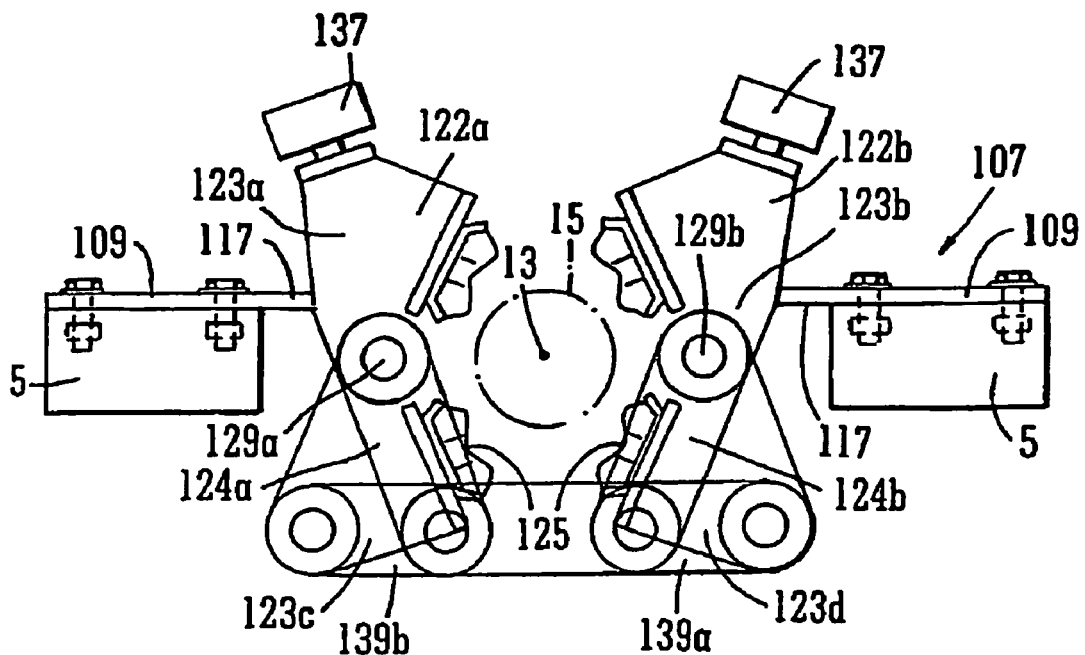
FIG. 9 is a view similar to FIG. 8 with the traction element in a released condition.
Figure 10:
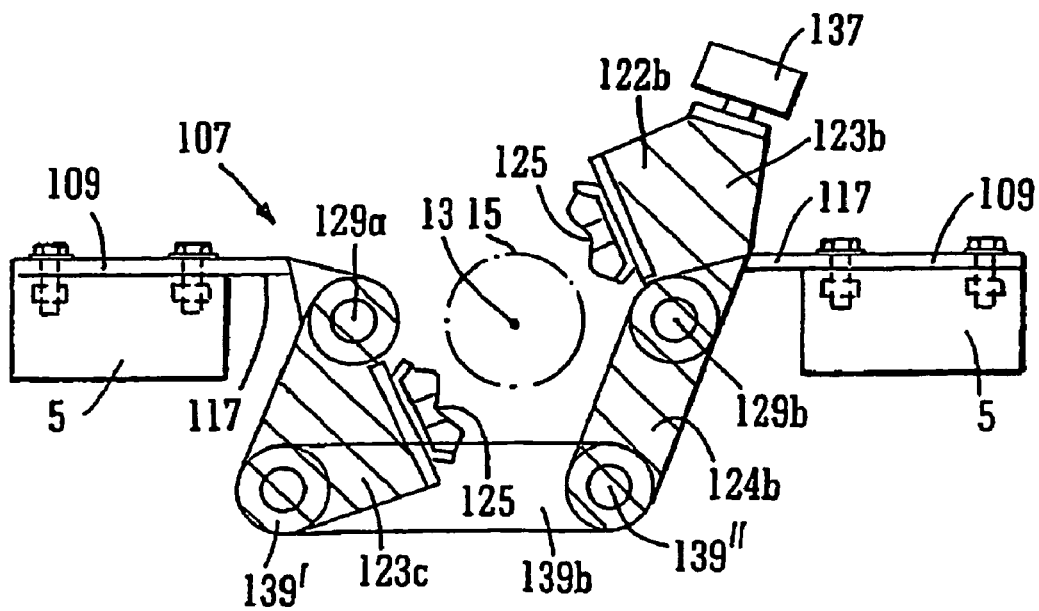
FIG. 10 is a view similar to FIG. 9 of a partially disassembled traction element.

Referring now to FIGS. 8 to 10 which illustrate a traction element 107 for a tensioner according to a second aspect of the invention, the traction element is mounted on a track 5 (not shown) by means of a pair of lateral wings 109 which depend from respective sides of a base unit 117 and may be formed integrally therewith. First, second third and fourth arms 123a, 123b, 123c and 123d are mounted on the base unit for movement about pivot axes 129a, 129b. The first and second arms 123a, 123b are essentially similar to one another and the third and fourth arms 123b, 123d are essentially similar to one another. The first and third arms 123a, 123c are mounted on one side of the base unit 117 and the second and fourth arms 123b, 123d are mounted on a second, opposite, side of the base unit 117. The first and third arms 123a, 123c pivot about a first pivot axis 129a and the second and fourth arms 123b, 123d pivot about a second pivot axis 129b.

Each of the four arms 123a, 123b, 123c and 123d is provided with a pad or cushion 125 which defines a gripping surface 127 for the member 15. The pad or cushion 125 of the first and second arms 123a, 123b is disposed on an upper part 122a, 122b of the arm, above the longitudinal axis 13 of the member 15. The third and fourth arms 123c, 123d extend in use principally below the longitudinal axis 13 so that the pads or cushions of these arms are disposed below the longitudinal axis 13.

The first and second arms 123a, 123b comprise a roller 137 which co-operates with guide rails in an analogous manner to the first aspect of the invention to move the first and second arms 123a, 123b from a first (released) condition (FIG. 9) to a second (gripping) condition (FIG. 8). As can best be seen from FIG. 10 (which shows the second and third arms only), the second arm 123b includes a lower portion 124b which extends below the pivot axis 129b. First arm 123a includes a corresponding lower portion 124a extending below pivot axis 129a. A link arm 139b extends between the lower portion 124c of second arm 123b and a lower part of third arm 123c and is pivotally attached to the third and second arms 123c, 123b at its respective ends 139' and 139". A corresponding link arm 139a links first arm 123a and fourth arm 123d. The link arms provide that as the first and second arms 123a, 123b arm moved by the guide rail from the first (released) position to the second (gripping) position, the third and fourth arms 123c, 123d also move from a release position to a gripping position. In this way, members 15 of differing sizes can be accommodated by the tensioner, with the gripping surfaces 127 remaining centred about the axis 13 of the member 15. That is, relative location of the member axis 13 with respect to the track 5 is independent of the member diameter.

Figure 6:
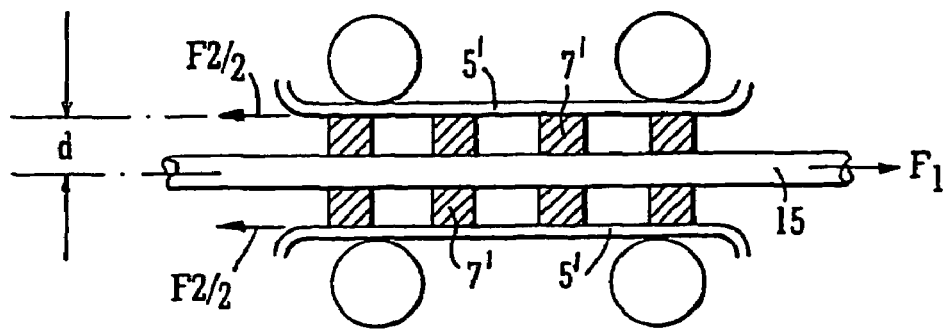
FIG. 6 is a diagram schematically illustrating forces acting on a typical prior art tensioner.
Figure 7:
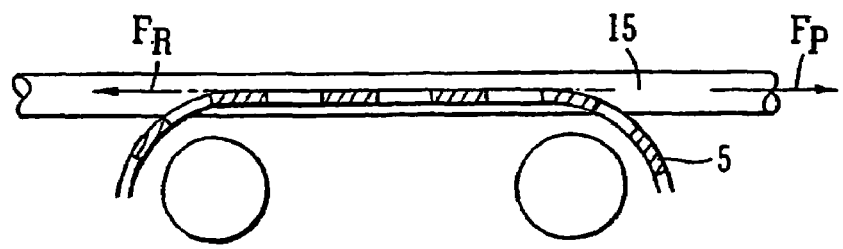
FIG. 7 is a diagram schematically illustrating the absence of corresponding forces on the tensioner according to the invention.

A particular advantage of the construction according to the present invention is that the normal gripping forces are isolated from the traction device, allowing the tensioner to be driven by a single traction device. In the prior art designs, drive means are required for each track of the tensioner. Furthermore, in the construction according to the present invention the forces that individual traction devices are required to resist are minimised. In particular, the construction according to the present invention aligns the longitudinal force on the member 15 with the line of action of the reacting force of the traction device to minimise the resultant couples applied to the traction elements. This can be seen in particular by comparison of FIGS. 6 and 7. In the prior art device of FIG. 6, a force $F_1$ exerted by the member 15 is reacted by reaction force $F_2$ at the traction elements 7' of tracks 5' (tracks 5' are shown in part only). Thus the traction elements 7' are subject to a couple equal to $(F_2/2).d$. This couple tends to tilt or skew the contact surfaces between the traction elements and the member, so reducing the contact area. As can be seen from FIG. 7, in the construction according to the invention, the force $F_P$ exerted by the member 15 is reacted by reaction force $F_R$ and there is no resulting couple.

What is claimed is:

1. A tensioner for deploying an elongate member comprising:
   i) an endless track including a plurality of traction elements, each traction element comprising:
      a base unit having at least a first gripping surface;
      a first moveable arm pivotally attached through a pivot axis to the base unit; and
      a second arm attached to the base unit,
      the respective first and second arms each including a further gripping surface, the first and second arms being arranged at respective sides of the base unit, the first arm being operatively moveable with respect to the base unit about said pivot axis between a first position in which the further gripping surface of said first arm is spaced from the member and a second position in which said further gripping surface of said first arm can contact the member;
   ii) drive means for driving the track so that the traction elements move along an endless path, said endless path including a path segment along which said first gripping surfaces operatively contact the member;
   iii) first guide means which operatively co-operates with the respective first arms to urge the first arms to move with respect to the respective base portions to which they are attached from said first position to said second position such that the first arms are maintained in said second position by said guide means as the traction elements move along said path segment; and
   iv) second guide means which operatively co-operates with said respective second arms to form for each second arm in said path segment, a reaction surface for a reaction force substantially normal to said surface and to the longitudinal axis of the member.

2. A tensioner as claimed in claim 1 wherein the second arm is pivotally attached through a second pivot axis to said base unit and is also operatively moveable with respect to said base unit about said second pivot axis between a first position in which the further gripping surface of said second arm is spaced from the member and a second position in which said further gripping surface of said second arm can contact the member and said second guide means operatively co-operates with the second arm to urge the second arm from said first position to said second position such that the second arm maintains said second position as the traction elements move along said path segment.

3. A tensioner as claimed in claim 1 wherein in said path segment, the pivot axis of each first moveable arm is operatively substantially aligned with the longitudinal axis of the member.

4. A tensioner as claimed in claim 1 wherein the first guide means presents a guide surface operatively co-operating with a contacting surface of the first arm, the guide surface extending generally longitudinally with respect to the member and being so shaped in a portion preceding said path segment to move said first arm from the first position to the second position and in a portion succeeding said path section to allow the first arm to move from said second position to said first position.

5. A tensioner as claimed in claim 2 wherein the guide means present respective first and second guide surfaces operatively co-operating with a contacting surface of said respective arms, the guide surfaces extending generally longitudinally with respect to the member and being so shaped in a portion preceding said path segment to move said arms from the first position to the second position and in a portion succeeding said path section to allow the arms to move from said second position to said first position.

6. A tensioner as claimed in claim 5 wherein the first and second guide surfaces are defined on first and second guide rails.

7. A tensioner as claimed in claim 4 wherein the contacting surfaces of each arm comprises a surface of a roller mounted on the arm for rotation about an axis substantially perpendicular to the pivot axis of the first arm.

8. A tensioner as claimed in claim 7 wherein the base unit comprises two first gripping surfaces such that when the arms are in their second position the four gripping surfaces are equidistantly spaced.

9. A tensioner as claimed in claim 1 wherein the endless track comprises first and second track belts operatively driven in unison and wherein each traction element includes first and second attachment wings extending laterally from the base unit and fixedly mounted on a respective track belt.

10. A tensioner as claimed in claim 2 wherein in said path segment, the pivot axes of each first moveable arm and of each second moveable arm are operatively substantially aligned with the longitudinal axis of the member.

11. A tensioner for deploying an elongate member comprising:
    i) an endless track including a plurality of traction elements, each traction element comprising a base unit including at least a first gripping surface and first moveable arm and a second arm each including a further gripping surface, the arms being mounted at respective sides of the traction element and the first arm being operatively moveable about a pivot axis between a first position in which the further gripping surface of said first arm is spaced from the member and a second position in which said further gripping surface of said first arm can contact the member;
    ii) drive means for driving the track so that the traction elements move along an endless path, said endless path including a path segment along which said first gripping surfaces operatively contact the member;
    iii) first guide means which operatively co-operates with the first arm to urge the first arm from said first position to said second position such that the first arm maintains said second position as the traction elements move along said path segment; and
    iv) second guide means which operatively co-operates with said second arm to form, in said path segment, a reaction surface for a reaction force substantially normal to said surface and to the longitudinal axis of the member;
    wherein the first guide means presents a guide surface operatively co-operating with a contacting surface of the first arm, the guide surface extending generally longitudinally with respect to the member and being so shaped in a portion preceding said path segment to move said first arm from the first position to the second position and in a portion succeeding said path section to allow the first arm to move from said second position to said first position; and
    wherein the contacting surfaces of each arm comprises a surface of a roller mounted on the arm for rotation about an axis substantially perpendicular to the pivot axis of the first arm.

12. A tensioner as claimed in claim 11 wherein the base unit comprises two first gripping surfaces such that when the arms are in their second position the four gripping surfaces are equidistantly spaced.

* * * * *